March 2, 1948.   G. R. STEINHOFF ET AL   2,437,135
AIRPLANE LANDING GEAR AND EMERGENCY RELEASE MECHANISM THEREFOR
Filed Nov. 5, 1943   4 Sheets-Sheet 1

GORDON R. STEINHOFF
JAMES W. BLAIR
INVENTORS

BY Reynolds & Beach
ATTORNEYS

March 2, 1948. G. R. STEINHOFF ET AL 2,437,135
AIRPLANE LANDING GEAR AND EMERGENCY RELEASE MECHANISM THEREFOR
Filed Nov. 5, 1943 4 Sheets-Sheet 2
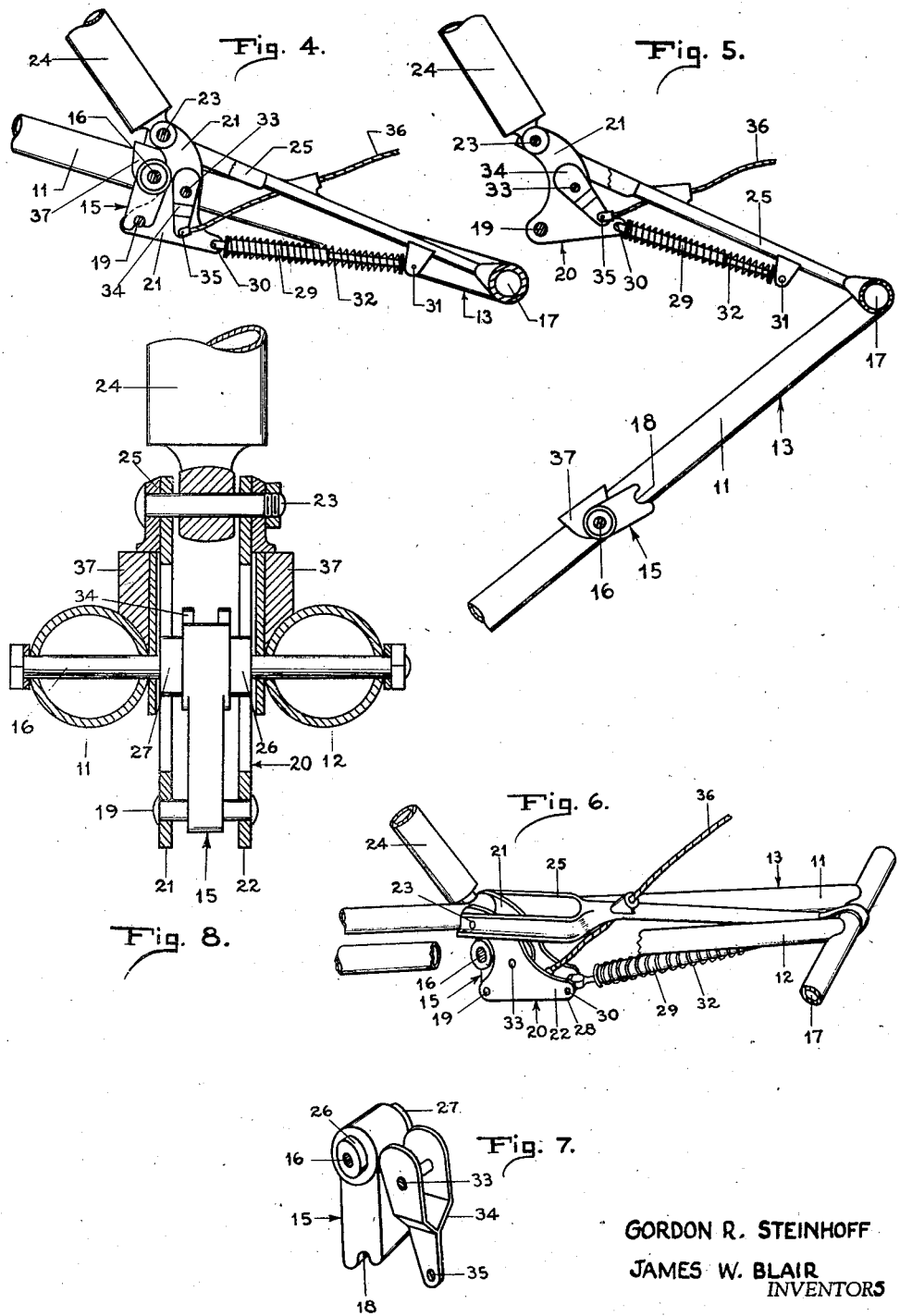
GORDON R. STEINHOFF
JAMES W. BLAIR
INVENTORS
BY *Reynolds + Beach*
ATTORNEYS

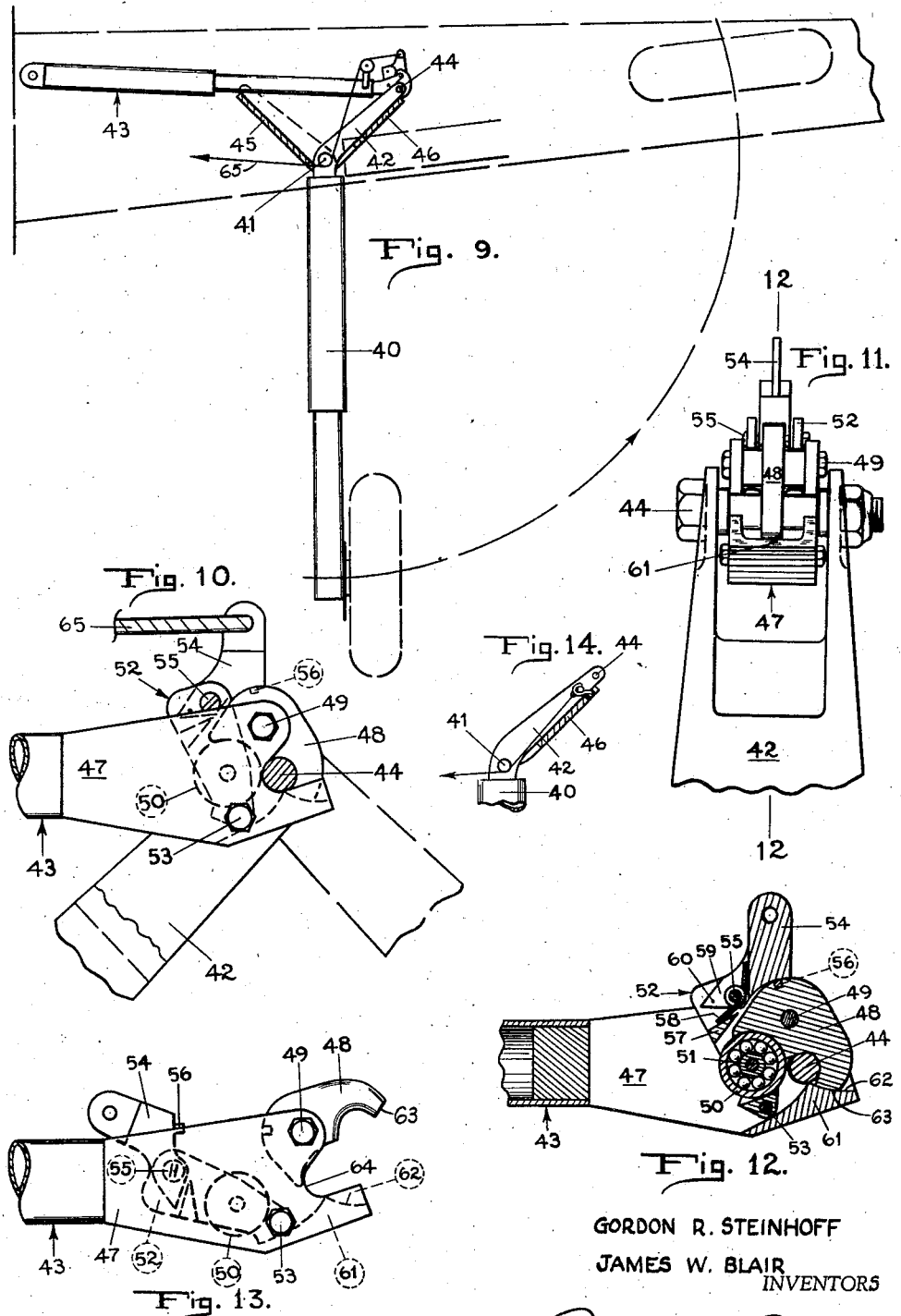

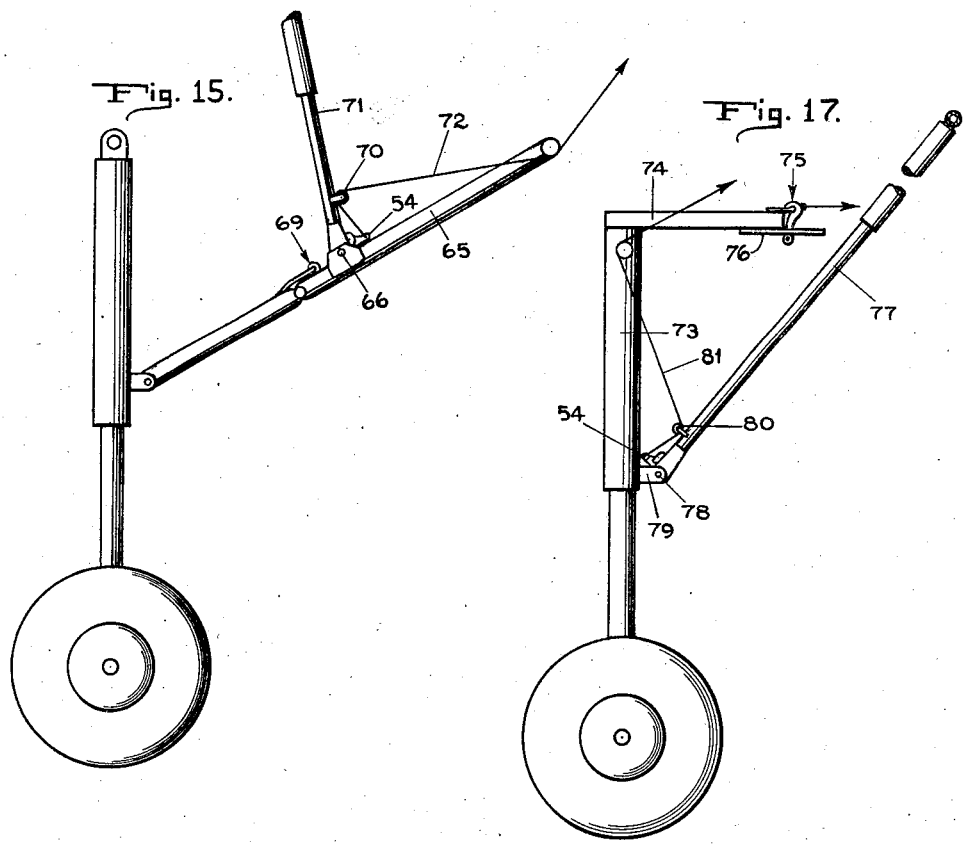
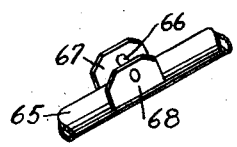

Patented Mar. 2, 1948

2,437,135

UNITED STATES PATENT OFFICE 2,437,135

AIRPLANE LANDING GEAR AND EMERGENCY RELEASE MECHANISM THEREFOR

Gordon R. Steinhoff, Santa Monica, Calif., and James W. Blair, Tulsa, Okla., assignors to Boeing Airplane Company, Wichita, Kans., a corporation of Delaware Application November 5, 1943, Serial No. 509,050

18 Claims. (Cl. 244—102)

This invention relates to an improvement in retractable landing gears for airplanes, and specifically to emergency mechanism for releasing the gear to drop into landing position upon failure of the normal operating mechanism, and for controlling the gear during such fall.

The primary object of the invention is to connect a retractable landing gear releasably to its operating mechanism as a positive measure of safety, so that in case such mechanism becomes inoperable for any reason, the landing gear may be disconnected from it to be moved by gravity into position to support the plane normally for landing.

Another object is to apply the principles of the invention to the retracting mechanism of various types of conventional landing gears without altering the major components or general organization of such retracting mechanism.

Other objects of the invention are to assure that the landing gear completes its movement into landing position after it is released from its retracting mechanism and thereafter to lock or hold the gear positively in such position. Moreover the fall of the gear toward its landing position may be retarded or snubbed to avoid damaging the landing gear or its supporting structure.

Discussion of several representative embodiments of the invention will serve to illustrate ways in which the objects mentioned above may be attained. It will be understood that the term "landing gear" embraces wheel, float and ski types which are capable of being retracted.

Figure 1 is a side elevation view of a rearwardly retractable landing gear embodying the invention, and Figure 2 is a fragmentary top perspective view of the releasable connection between the retracting unit and the jointed landing leg brace strut. Figure 3 is an enlarged fragmentary side elevation view of the upper portion of the landing gear and the lower portion of the brace strut shown in Figure 1, as viewed from the opposite side, and illustrates an arrangement for forcing the brace strut into extended position, and for locking its parts in such position.

Figure 4 is a fragmentary side elevation view, with parts broken away, of a releasable connection between a retracting jack and a jointed brace strut generally similar to that shown in Figures 1 and 3 with the parts shown in normal retracted position. Figure 5 is a similar view in which the brace strut has been released from the jack and has dropped into the position which it assumes under emergency conditions. Figure 6 is a top perspective view showing further details of construction of this form of the releasable connection shown in Figures 4 and 5 with the parts in interconnected relationship. Figure 7 is a top perspective view of elements of this connection in the relative positions occupied when the jack and brace strut are interconnected. Figure 8 is a substantially vertical section through the connection with its elements interengaged for normal operation of the landing gear.

Figure 9 is a front elevation view with parts broken away, illustrating a laterally retractable landing gear embodying the invention, the mechanism for releasably connecting the landing leg to its retracting jack being of a type different from that illustrated in Figures 1 to 8.

Figure 10 is a fragmentary side elevation view of the releasable leg to jack connection with parts broken away, and shows these elements locked together, and Figure 11 is a fragmentary end elevation view of such connection. Figure 12 is a section taken along line 12—12 of Figure 11, the landing leg structure being omitted. Figure 13 is a side elevation view similar to Figure 10, with the elements of the connection carried by the jack shown in unlocked position. Figure 14 is a side elevation view of the upper portion of the landing leg showing a latch for automatically locking the leg in landing position after it has been released from the retracting jack of Figure 13.

Figure 15 is a side elevation view of a landing gear somewhat similar to that of Figures 1 to 3 with a different retracting jack connection embodying the invention in modified form. Figure 16 is a fragmentary top perspective view showing the jack engaging member on the landing leg brace strut.

Figure 17 is a side elevation view of a further modified type of landing gear embodying the invention.

Figure 1:
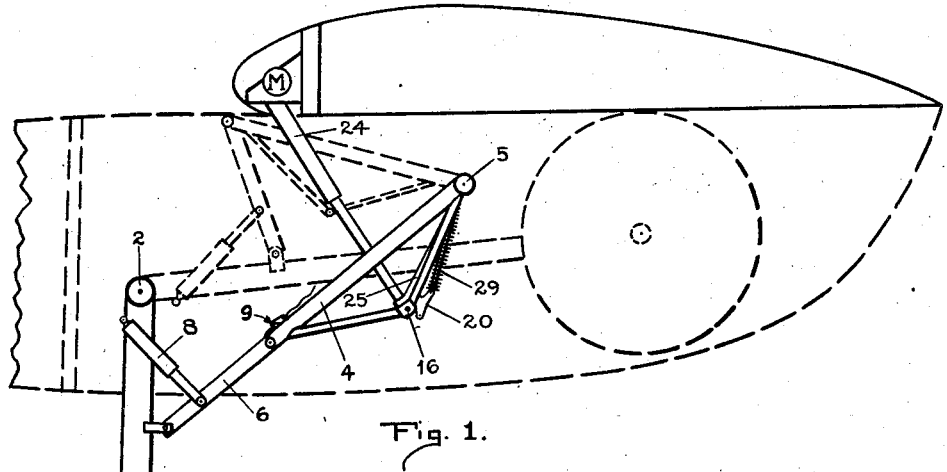

The several embodiments of the invention illustrate its adaptation to types of landing gears which are generally conventional. The landing gear of Figure 1 includes a leg 1, which may incorporate shock absorbing mechanism, having a ground engaging member, such as the wheel 3, at its lower end. The leg may be mounted upon a pivot 2 carried by an engine nacelle, for example, to guide the leg for swinging from landing position rearwardly and upwardly in a longitudinal vertical plane to the retracted position shown in broken lines in Figure 1. This operation may be accomplished by a jack 24 of either the hydraulic or the screw type releasably connected to one link 4 of dog-leg linkage pivoted by tube 5 to the engine nacelle. The other link 6 is pivoted to the landing leg at a point such that when the leg is in landing position the links are aligned to form a brace strut extending rearwardly and upwardly from the leg.

As the landing gear moves downward from retracted position the links 4 and 6 move toward alignment, and the angle between link 6 and leg 1 decreases. Spanning this angle is a compression spring 7 encircling a telescoping stiffener 10 which prevents buckling of the spring. The ends of this stiffener are pivoted, respectively, to the leg 1 and to the link 6, and the spring is compressed between shoulders at opposite ends of the stiffener as the landing leg moves downward and the link 6 swings toward the leg. As these parts approach the position of Figure 3 the force exerted by the compressed spring 7 urges link 6 away from the landing leg and into alignment with link 4, to withstand the compressive stress exerted upon the strut created by drag loads applied to leg 1 by the wheel 3. Interconnecting the landing leg and link 6, and located at the side of the leg opposite spring 7, is a shock absorber or dashpot 8, contracted by swinging of link 6 toward leg 1, to damp downward swinging of the leg near the end of its movement.

To carry out the principal purpose of the present invention the connection between link 4 and jack 24 is releasable, so that when the landing gear is in its retracted position these parts may be disconnected quickly in the event that the jack operating mechanism should fail, or if it should become necessary to move the gear into landing position more quickly then this operation could be accomplished by extension of the jack. As link 4 is released from the jack the weight of the landing gear will swing the leg and strut linkage downward, such movement being damped by the dashpot 8, and perfect alignment of the links 4 and 6 will be assured by the action of spring 7, as explained above. Links 4 and 6 are automatically locked in alignment by engagement of the latch hook and finger 9 of Figure 3, which can be released at will by pulling the cable shown attached to the hook.

The particular construction of the releasable connection between jack 24 and link 4 is important to the reliability of the emergency release operation. Because of the relative location of the brace strut and jack pivots on the airplane, and the disposition of the link 4 in retracted and landing positions of the gear, it is desirable to make such link in the form of a triangular truss fabricated from tubes. The lower end of the jack plunger is releasably connected to a cross rod 16 extending through the downwardly directed apex of this truss.

The jack plunger may be pivoted by a pin 23 to the bifurcated end of an arm 25 which is journaled on the pivot tube 5 of link 4 to swing relative to such link, for guiding and controlling the position of the lower end of the jack. Such jack end may be latched by a pivoted latch 20 to the cross rod 16 interconnecting the side frames of the truss link 4, to hold the jack end and link in fixed relationship, and to interconnect the link and arm 25 for conjoint movement as a unit. This latch is normally urged into locking position by a compression spring 29 interengaged between the heel of the latch and arm 25. A telescoping spring stiffener extending through this spring is pivoted to the arm and the latch heel.

Figure 2:
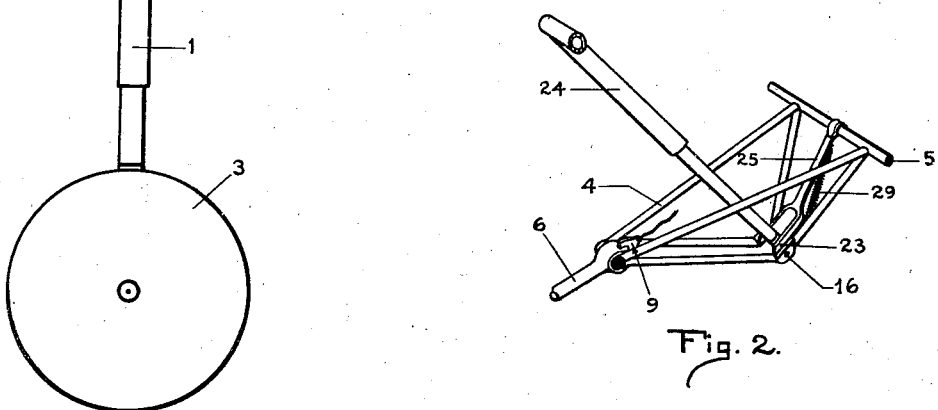
Figure 3:
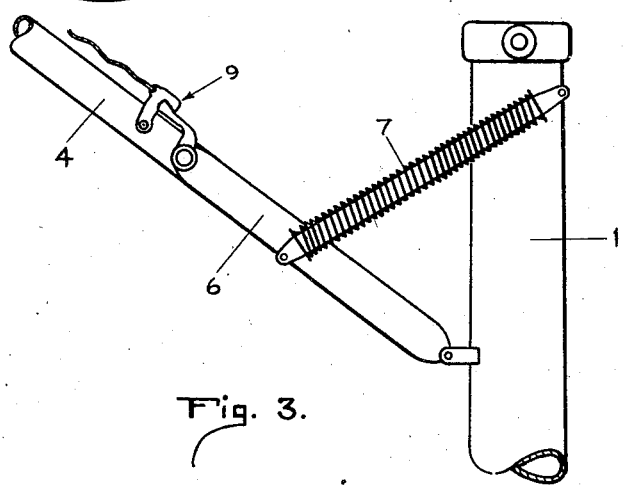

A releasable connection similar to that utilized in the landing gear of Figures 1 to 3 is shown in greater detail in Figures 4 to 8. In this instance the brace strut includes a link 13 composed of two parallel tubes 11 and 12 interconnected at spaced locations by a cross rod 16 and a pivot tube 17. This pivot tube is journaled on the airplane structure to enable link 13 to swing during movement of the landing gear between retracted and landing positions. A latch finger 15 is pivoted upon rod 16 with a fit sufficiently snug that it will not be swung by the action of gravity away from any position into which it is rotated positively.

The bifurcated swinging end of arm 25 interposed between link tubes 11 and 12 forms a clevis embracing both latch 20 and the end of the plunger of jack 24, which are interconnected by a pivot pin 23. The latch includes two generally triangular plates 21 and 22 interconnected by four pins, one at each apex and the other located centrally of the plates. Pin 23 at one apex constitutes a pivot about which the latch plates may swing relative to the jack end and arm 25, and serves as the main support for the latch. The heel apexes of the plates are interconnected by a pin 30, on which is also mounted one end of a telescopic spring stiffener 29, the other end being pivoted to a lug on arm 25 by pin 31. Compression spring 32 encircling the stiffener reacts between this lug and the latch heel, urging the latch to swing about pin 23 toward rod 16 on which latch finger 15 is journaled. Such swinging of the latch is limited by pressure of the portions of the latch plate edges between pins 23 and 19 against shoulders 26 and 27 formed on the journaled end of the latch finger.

When the latch parts are in locked position the flanged lower edge of bifurcated arm 25 is engaged with spaced blocks 37 secured, such as by welding, to tubes 11 and 12 at the location of rod 16, to space pin 23 from such rod. The latch finger is of a length with relation to the spacing of pivot 23 and rod 16, established by abutment of these blocks against the arm, such that a notch 18 in its lower end will embrace latch pin 19 interconnecting the toe apexes of latch plates 21 and 22. The jack pivot pin 23 and rod 16 are thus held against separating movement transversely of link 13, for transmitting between these parts loads tending to separate them during normal retraction and extension of the landing gear by the jack. Bearing engagement of blocks 37 and arm 25 prevents the latch and latch finger from being uncoupled by approach of the link and jack, either by a compression load in the strut created by drag forces on the landing gear tending to disalign the two links 4 and 6 of such a dog-leg strut as in Figure 1, if not otherwise held in alignment such as by latch 9, or by pressure of the jack in forcing the links of such a strut into alignment near the end of the jack extension travel. Arm 25, in substantial registry with tubes 11 and 12 of link 13, holds pivot pin 23, connected to the jack plunger, definitely spaced from link pivot tube 17, so that the jack plunger end cannot move lengthwise of the link. The jack end is thus prevented from moving in any direction relative to the link cross rod 16. Forces are therefore transmitted between the link and jack just as though its plunger were journaled directly upon rod 16.

During normal extension and retraction of the landing gear the pull of the jack is transmitted through the latch 20 and latch pin 19 to create a compression force in latch finger 15, which acts through rod 16 to lift the link or hold it in retracted position. Preferably latch pin 19 and pivot 23 define a plane substantially perpendicular to link 13 when the latch parts are engaged. The latch pin, however, is swung slightly past the plane defined by rod 16 and pin 23 so that the pressure of the latch finger on the latch pin will have a component acting perpendicular to such plane toward the left in Figure 4, and a second component parallel to such plane acting away from pivot 23. The former component will create a moment supplementing the moment produced by spring 32, tending to swing the latch clockwise, and the latter component will exert an opposing moment of relatively small value because of the short lever arm through which it acts about pivot 23. However great the compressive force in link 15 may be, therefore, the edges of latch plates 21 and 22 will be pressed firmly against shoulders 26 and 27 of the latch finger, to lock the latch finger in engagement with the latch pin. To enable the latch pin 19 to be thus disaligned from pin 23 and rod 16 the edges of the latch plate abutting the latch finger should be concave or notched, as shown in Figures 4 and 6 in which the nearer tube 12 of link 13 has been broken away to reveal the relationship of these parts. The degree of such concavity and the radius of the latch finger shoulders 26 and 27 determine the extent of offset of latch pin 19 from the plane of rod 16 and pivot 23 when the parts are in locking relationship.

With the latch members engaged, link 13 and arm 25 are swung as a unit by the jack during normal movement of the landing gear between landing and retracted positions. If the jack should fail to operate, or if it should be desired to move the landing gear from retracted position into landing position more quickly than could be effected by jack extension, latch finger 15, carried by link 13, may be disconnected from latch 20, carried by the jack, to permit the link 13 to swing downward into the position of Figure 5 as the landing gear moves into landing position, whereas arm 25 remains unmoved inclined upwardly from tube 17 as shown in both Figures 4 and 5, to prevent free swinging of the released end of the jack.

Disengagement of the latch finger from the latch pin is effected by pulling release cable 36 fastened in aperture 35 of bifurcated lever bar 34, to swing it about pivot pin 33, interconnecting the central portions of latch plates 21 and 22, on which it is mounted. Such rotation of the lever presses its bifurcated end against the journaled portion of latch finger 15 constituting a fulcrum, as shown in Figures 4 and 7, to pry pin 33 away from the link rod 16. This action swings the entire latch counterclockwise, in opposition to the force of spring 32 and the moment created by the lateral component of the force exerted on latch pin 19 by latch finger 15.

As soon as the latch pin has been swung to the opposite side of the plane defined by pivot pin 23 and link rod 16 a force component perpendicular to such plane will act on pin 19 toward the right in Figure 4, creating a moment tending to swing latch 20 counterclockwise in opposition to the moment produced by spring 32. The weight of the landing gear now assists the pull on cable 36 until the latch has been swung counterclockwise sufficiently so that the moment created by the lateral force component on latch pin 19 equals the total moment effected by spring 32 and by the component of the force on pin 19 acting parallel to the plane of pin 23 and rod 16. Beyond this equilibrium point the weight of the landing gear itself creates a progressively increasing excess moment which will complete disengagement of the latch finger from the latch pin even though the pull on cable 36 is discontinued. The latch and latch finger will continue to be rotated in a counterclockwise direction until the finger has been swung into the position of Figure 5, in which it clears the latch pin. Link 13 is then completely disconnected from jack 24 so that the landing gear may drop free, carrying link 13 with it into the position of Figure 5.

To reconnect the jack 24 and the landing gear link 13 for normal operation it is merely necessary to extend the jack, at the same time maintaining tension on cable 36 sufficient to swing latch 20 counterclockwise in opposition to the action of spring 32. As the jack is extended arm 25 will be swung downward about pivot tube 17 to guide the end of the jack plunger and the latch so that its pin 19 will drop into notch 18 of latch finger 15 in the position of Figure 5. To facilitate entrance of the latch pin into the latch finger notch it is desirable that the ridge forming the side of the notch remote from the latch be longer than the ridge nearer the latch. Continued extension movement of the jack will swing the latch finger clockwise, accompanied by similar movement of the latch caused by interengagement of the pin and finger. As the fulcrum end of lever 34 engages the journaled end of finger 15 the tension on cable 36 may be relaxed, because the latch finger will then have been swung downward sufficiently far to enable the force of spring 32 to complete movement of the latch and finger into the locked position of Figure 4, in which the latch plates are pressed against shoulders 26 and 27 of the latch finger. Any compression force thereafter produced in the latch finger by the weight of the landing gear as the jack plunger moves upward will act upon latch pin 19 in a direction again to hold the latch parts in engagement in the manner previously described.

In Figures 9 to 13 a disengageable connection is shown incorporated in a landing gear which swings transversely of the direction of flight upward and outward from landing position into retracted position. A landing gear retractable in this manner is shown in Patent No. 2,278,910, issued April 7, 1942, to E. M. Bertran. The landing leg 40 may be attached to an airplane wing, for example, by pivot 41. To a horn 42 integral with the leg and projecting upward above its pivot is connected the jack 43 extending generally spanwise of the wing. To enable the landing gear to drop from retracted position into landing position without extension of the jack the connection between the jack plunger and landing leg horn is made releasable by application of the principles of the present invention.

A latch pin 44 connects bifurcations formed by the upper end of horn 42. The jack 43 is fastened to such pin by a connection enabling the horn to swing through an angle somewhat greater than 90 degrees, between a position adjacent to one side 45 of an angle bracket stop, when the gear is in retracted position, and a position adjacent to the other side 46 of such angle bracket, when the gear is in landing position.

The channeled end 47 of the jack plunger is notched to engage pin 44 on the landing leg horn 42 by endwise movement of the plunger. The latch pin is retained in this notch by a latch finger 48 pivoted in the jack plunger end channel by pin 49 to swing between the latched position bridging the notch shown in Figure 10 and the unlatched position of Figure 13. The latch finger also is notched for reception of the latch pin. Pivot 49 extends through a portion of the jack plunger end located at one side of the plunger notch, and the heel portion of the latch finger projects from the pivot pin into the channel when the toe portion is in latch pin holding position.

In this arrangement it will be noted that the latch pin is carried by the landing gear, while the latch finger is pivoted to the jack plunger, but the mounting of these parts may be reversed so that the latch finger is secured to the landing gear and the latch pin is on the jack plunger, as in the embodiment of the invention previously described. In this installation, however, in either case, the landing gear weight does not act in a direction to hold the latch finger and pin engaged. Consequently instead of relying only upon direct spring pressure to swing the latch finger into and to hold it in pin-engaging position a positive locking arrangement is employed to insure that these parts cannot be disengaged inadvertently.

This lock is a pawl 52, including a ball or roller bearing 50 on spindle 51, which swings about pivot pin 53 interconnecting the channel sides of the jack plunger end 47. This pawl bearing may be shifted between a locking position engaged beneath the heel of finger 48 and an inoperative position in which it does not block rotation of the latch finger. Movement of the locking pawl 52 from finger-engaged position into released position is accomplished by swinging lever 54 on the pawl in a counterclockwise direction about pin 53.

While, as stated above, provision of the locking pawl is necessary because the landing gear weight does not act in a direction to hold the latch pin 44 and finger 48 engaged, but on the contrary tends to separate them, such force may nevertheless be utilized to hold the latch finger pawl in locking position. The jack pulling force is transmitted through pins 49 and 53 to latch finger 48, and thence through latch pin 44 to the landing leg horn 42 carrying the latch pin. Pivot 53 may be located sufficiently far to the left in Figures 10, 12 and 13 so that, when the pawl is in engaged position, pressure of the latch finger heel on bearing 50, caused by the force between the latch finger and pin, will be in a direction tending to swing the pawl farther clockwise about pivot 53 toward locking position, yet it could still be moved to unlocked position by swinging lever 54 in a counterclockwise direction.

If pivot 53 is not located sufficiently far to the left in Figure 12 to provide such self-locking action a positive connection between the pawl and latch finger is desirable to prevent inadvertent disengagement of the latch parts. For this purpose lever 54 may be pivotally connected to pawl 52 by pin 55. A shoulder on the lever engageable with the journaled portion of latch finger 48 has a projection, such as pin 56, to fit in a cooperating recess in the latch finger. To retain the pin 56 in its recess against inadvertent displacement a torsion spring 58 encircling lever pivot pin 55 reacts between a ledge 57 formed on pawl 52 and a notch in lever 54. A heel 59 projecting from the portion of lever 54 at the side of pivot 55 opposite pin 56 is engageable with ledge 57 to limit relative pivotal movement of the lever and pawl. When a pull is exerted on cable 65 for swinging the lever to withdraw pin 56 from its recess, locking pawl 52 may remain stationary until the lever heel 59 contacts the ledge. Thereafter the lever can not swing farther about pin 55 but the lever and pawl will be swung together about pivot 53 as a unit, as shown in Figure 13. As a further precaution to prevent accidental disengagement of pin 56 from latch finger 48 a shear or safety wire 60 may interconnect the lever 54 and pawl 52, which can be severed by a landing gear releasing pull on cable 65.

The channel web 61 of the jack plunger end 47 may be cut away at 62 to enable the swinging end or toe 63 of latch finger 48 to move well beyond the latch pin 44. This recess also forms a seat for the toe 63 limiting the extent of its movement into the latch pin receiving notch so that the finger cannot bind the latch pin when it rotates during normal extension or retraction of the landing gear. When the latch finger toe is engaged with the bottom of the recess 62, however, the finger is sufficiently close to the bottom of the notch receiving the latch pin to prevent excessive play.

During normal operation of the retracting jack the latch pin secured to the landing leg horn 42 will be held in the notch of the jack plunger 47 by the latch finger 48 being locked in the position of Figures 10, 11 and 12. As previously explained, the latch finger is thus locked by engagement of pin 56 on lever 54 in the complemental recess in the latch finger, despite the opposed jack force and landing gear weight tending to separate them. By such engagement the bearing 50 of pawl 52 is held firmly against the heel portion of the latch finger, and inadvertent tilting of lever 54 relative to the pawl to unlock it by withdrawing pin 56 from its recess is prevented either by the action of torsion spring 58 or shear wire 60.

When it is desired to release the landing leg horn from the jack for extension of the landing gear under emergency conditions a pull on cable 65 will flex spring 58 or shear wire 60, or both, so that lever 54 is tilted to withdraw pin 56 from its recess in the latch finger. As the pull on cable 65 continues, the lever will be swung until its heel 59 engages the pawl ledge 57. The force on the lever will then be transmitted through pin 55 and heel 59 to the pawl so that it will be swung positively in a counterclockwise direction about pivot pin 53, into the position shown in Figure 13.

Such movement of the pawl will withdraw bearing 50 from engagement beneath the heel of latch finger 48. The weight of the landing gear acting about pivot 41 urges latch pin 44 to the right in Figures 10 and 12, so that as soon as the latch finger 48 is unlocked by withdrawal of the bearing, the pressure of pin 44 will flip the finger upward into the position of Figure 13, and the latch pin will move out of the notch in jack end 47 to disconnect the landing leg horn from the jack. The leg may then swing without restraint into landing position while the jack remains in contracted position. When the jack is extended to reconnect its plunger with the landing leg horn, the plunger is guided to pin 44 by the side 45 of the leg stop bracket on the upper edge of which it rests, as shown in Fig. 9.

While not shown in connection with this modification, it will be understood that a damping device, such as the dashpot 8 in Figure 1, may be incorporated in this type of installation as well.

Also a spring to insure movement of the gear fully into landing position may be used. When the landing gear, thus released from the jack, has reached landing position it may be locked in such position by the addition of a hook carried by a side of angle 46 in position to engage a pin provided on the landing leg horn 42, as shown in Figure 14. The hook may be disengaged from the pin by pulling a release wire fastened to it.

Further adaptations of the latch and latch locking mechanism shown in Figures 9 to 13, inclusive, are presented by Figures 15 and 17. In both of these instances the jacks are generally upright instead of being horizontal, but in each instance the latch and locking mechanism carried by the end of the jack plunger cooperates with a latch pin on an element of the landing gear. Figure 15 illustrates how the latch and locking mechanism of Figures 9 to 12 may be used for a landing gear of the general type shown in Figure 1. In this instance the brace strut is formed simply of two tubes connected end to end to constitute dog-leg linkage, rather than the link connected directly to the airplane being of trussed structure.

On the link tube 65 a latch pin 66 is secured to and between spaced parallel plates 67 and 68 welded to opposite sides of the tube as shown in Figure 16. The latch lock release cable 72 connected to lever 54 passes around a pulley 70 journaled in a bracket on jack plunger 71, and thence upward around the pivot tube of link 65 so that it will not be tensioned by normal retraction or extension of the landing gear. When this cable is pulled, lever 54 is swung to unlock the latch finger, as previously described, and the weight of the landing gear acting on pin 66 will swing the latch finger out of the way and move it out of the notch in the end of plunger 71 as the landing gear starts to swing downward toward landing position. Although not shown in this figure, a dashpot to cushion downward movement of the landing gear and a compression spring to insure completion of its movement into landing position, as described in connection with the landing gear of Figures 1 and 3, may be employed. The latch 69 to retain the two links of the dog-leg linkage in aligned relationship may also be similar to the latch 9 of Figures 1 and 3.

To illustrate the ready adaptability of the latch and locking mechanism described above to various types of conventional landing gears it is shown applied to still a different type of gear in Figure 17. In this instance the jack itself constitutes the brace strut for landing leg 73. When the landing gear is in landing position an arm 74 extending rearwardly from the upper end of the leg adjacent its pivot may be held against plate 76 by a hook 75. This arrangement will retain the leg in its landing position when the bracing action of the jack is not available after jack plunger 77 has been disconnected from latch pin 78 during an emergency. In this instance the latch pin is supported directly from the landing leg by a bracket 79. The latch lock releasing cable 81 secured to lever 54 passes around a pulley 80 carried by jack plunger 77 and a second pulley 82 on the upper end of the leg 73 rotating on an axis substantially coincident with the pivot about which landing leg 73 swings. Such disposition is necessary to prevent the cable being pulled by customary retraction of the landing gear. Similarly cable 36 may be looped around tube 17 in the form of Figures 4 to 8, or sufficient slack may be left in the cable so that it will not be pulled to release the latch during normal extending movement of the landing gear into landing position. In either case, of course, and in all types of arrangement illustrated, the release cable can be pulled to disconnect the retracting means from the landing gear in whatever position the landing gear may be, although such release operation would normally be effected when the landing gear is in retracted position.

The invention claimed is:

1. In a retractable landing gear, a landing gear member movable between retracted and landing positions, retracting means, means normally connecting said retracting means to said member to move it positively in both directions between retracted and landing positions, and releasable at will to disconnect said retracting means from said member for movement from retracted position into landing position independently of said retracting means, a reaction member and spring means engaged with and reacting between said reaction member and said landing gear member, stressed by initial downward movement thereof toward landing position after it is disconnected from said retracting means, and operable by relief of stress therein by reactive displacement of said spring during the terminal portion of the movement of said member toward landing position to assist completion of such movement.

2. In a retractable aircraft landing gear, a landing leg pivoted upon the aircraft, a leg retracting member connected to said landing leg and swingable relative to the aircraft structure during movement of the landing leg between retracted and landing positions, a jack pivoted upon the aircraft for extension and contraction transversely of said leg retracting member, and latch means normally interconnecting said jack and said leg retracting member to swing said landing leg between retracted and landing positions by operation of said jack, means operable at will to unlock said latch for disconnection of said latch means to enable said leg retracting member and landing leg to move from retracted position into landing position independently of movement of said jack, and means guiding movement of said jack relative to said leg retracting member transversely thereof for reconnection of said latch means when said leg retracting member is in landing position.

3. In a retractable aircraft landing gear, a landing gear leg swingable about a pivot upon the aircraft structure, a plunger arm operable to exert a retracting force upon the landing gear, a leg-swinging arm connected to said leg, a latch pin carried by and extending transversely of one of said arms, a latch finger pivoted upon the other of said arms to swing about an axis parallel to said latch pin, and engageable with said latch pin to interconnect said arms for transmission of the retracting force therethrough from said plunger arm to said swingable landing gear member, and means including a latch finger release element pivoted to swing about an axis parallel to said latch pin and engageable with said latch finger, operable to unlock said latch finger for disengagement of said latch pin and said latch finger by the weight of the landing gear acting upon said leg-swinging arm.

4. In a retractable aircraft landing gear, a landing leg, a leg retracting member connected to said landing leg and pivoted to swing about an axis fixed relative to the aircraft structure during movement of the landing leg between retracted and landing positions, a jack carried by the aircraft for extension and contraction transversely of said leg retracting member and including a plunger member, a latch pin carried by one of said members, a latch finger pivoted upon the other of said members and engageable with said latch pin, holding means reacting from one of said members and normally operable to hold said latch pin and said latch finger in locking engagement to interconnect said members for transmission of the jack force from said plunger member to said leg retracting member, and means operable to unlock said holding means for disengagement of said latch pin and said latch finger by the weight of the landing gear acting upon said leg retracting member, thereby to enable said leg retracting member to swing independently of said jack during movement of said landing leg from retracted position into landing position.

5. In a retractable aircraft landing gear, a landing gear member swingable about a pivot upon the airplane structure during movement of the landing gear between retracted and landing positions, a jack member operable to exert a force upon said landing gear member to retract the landing gear and to hold it in retracted position, a latch pin carried by one of said members, a latch finger pivoted upon the other of said members and having a notch in its swinging end engageable with said latch pin, holding means reacting from the one of said members carrying said latch pin and normally operable to hold said latch finger in locking engagement with said latch pin to interconnect said members for movement of the landing gear by said jack member, a lever swingable to unlock said holding means for rotation of said latch finger by the weight of the landing gear acting upon said swingable landing gear member, for disengaging said latch pin from the latch finger notch to disconnect the landing gear member and plunger member, and a tension member connected to said lever for swinging the same by a pull thereon.

6. In a retractable aircraft landing gear, a landing gear member swingable about an axis upon the aircraft structure during movement of the landing gear between retracted and landing positions, an arm swingable relative to said landing gear member about the same axis, retracting means connected to the swinging end of said arm, means supporting said retracting means for movement between landing gear retracted and landing positions while guided by said arm connected thereto, and latch means operable to interconnect said retracting means and said landing gear member for conjoint swinging of said arm and landing gear member as a unit by said retracting means to move the landing gear between retracted and landing positions.

7. In a retractable aircraft landing gear, a landing gear member swingable about an axis upon the aircraft structure during movement of the landing gear between retracted and landing positions, an arm swingable relative to said landing gear member about the same axis, a jack connected to the swinging end of said arm, means supporting said jack for movement between extended and contracted positions while guided by said arm connected thereto, and latch means operable to interconnect said jack and said landing gear member for conjoint swinging of said arm and landing gear member as a unit by said jack to move the landing gear between retracted and landing positions.

8. In a retractable aircraft landing gear, a landing gear member swingable about an axis on the aircraft structure during movement of the landing gear between retracted and landing positions, an arm swingable relative to said landing gear about the same axis, retracting means connected to the swinging end of said arm, a latch member swingable relative to said arm, a complemental latch member carried by said landing gear member, and spring means reacting between said arm and said latch member carried thereby to urge said arm carried latch member into engagement with said latch member carried by said landing gear member to interconnect said retracting means and said landing gear member for conjoint movement, but said spring means being yieldable for disengagement of said retracting means and said landing gear member for movement of the latter into landing position independently of said retracting means.

9. In a retractable aircraft landing gear, a landing gear member swingable about an axis on the aircraft structure during movement of the landing gear between retracted and landing positions, including two spaced elements, a rod interconnecting said elements, a latch finger journaled on said rod, retracting means at one side of said rod, a latch member pivoted to said retracting means and extending therefrom generally transversely of said landing gear member alongside said rod to the side thereof opposite said retracting means, the portion of said latch member at the side of said rod remote from said retracting means being engageable with the swinging end of said latch finger in relative positions such that a force transmitted between said retracting means and said rod through said latch member and said latch finger normally act to hold them in engagement.

10. In a retractable aircraft landing gear, a landing leg, dog-leg linkage interconnecting said landing leg and said aircraft for movement between aligned position of the links, constituting a brace strut when the landing gear is in landing position, and disaligned position in retracted position of the landing gear, an arm swingable relative to said dog-leg linkage, a jack permanently pivoted to the swinging end of said arm to be guided thereby, and latch means normally interconnecting said jack and said linkage to swing as a unit as the landing gear is moved by said jack between retracted and landing positions, and releasable when the landing gear is in retracted position for disconnection of said jack and linkage to enable the landing gear to move into landing position independently of the jack and arm, and while the jack remains contracted and located by said arm.

11. In a retractable aircraft landing gear, a landing leg pivoted upon the aircraft, dog-leg linkage including two links one pivoted to the aircraft structure and the other pivoted to said landing leg and pivoted together to swing between disaligned position when the landing leg is retracted and aligned position when the landing leg is in landing position, retracting means, means normally connecting said retracting means to said dog-leg linkage for exerting a force to swing the landing leg positively in both directions between retracted and landing positions, and releasable to disconnect said retracting means from said linkage for movement of the landing gear and linkage into landing position independently of said retracting means, and means operable to urge the links of said dog-leg linkage toward aligned relationship for moving the landing leg into landing position.

12. In a retractable aircraft landing gear, a landing leg pivoted upon the aircraft, dog-leg linkage including two links one pivoted to the aircraft structure and the other pivoted to said landing leg and pivoted together to swing between disaligned position when the landing leg is retracted and aligned position when the landing leg is in landing position, retracting means, means normally connecting said retracting means to said dog-leg linkage for exerting a force to swing the landing leg positively in both directions between retracted and landing positions, and releasable to disconnect said retracting means from said linkage for movement of the landing gear and linkage into landing position independently of said retracting means, and means operable upon disposition of said landing leg in landing position to hold the links of said dog-leg linkage in aligned relationship for maintaining the landing leg in landing position.

13. In a retractable aircraft landing gear, a landing gear member movable during movement of the landing gear between retracted and landing positions, a retracting member carried by the aircraft, a latch pin on one of said members, a latch finger pivoted on the other of said members for engagement with said latch pin to interconnect said landing gear member and said retracting member for normal movement of the landing gear between retracted and landing positions by said retracting member, a locking pawl normally operable to hold said latch finger in engagement with said latch pin, and releasing means operable at will to disengage said locking pawl from said latch finger for disconnection of said latch pin and latch finger, to enable said landing gear member to swing independently of movement of said retracting member during movement of the landing gear from retracted to landing position.

14. In a retractable aircraft landing gear, a landing gear member movable during movement of the landing gear between retracted and landing positions, a retracting member carried by the aircraft, a latch pin on one of said members, a latch finger pivoted on the other of said members for engagement with said latch pin to connect said landing gear member and said retracting member for normal movement of the landing gear between retracted and landing positions by said retracting member, a locking pawl pivoted on the same member on which said latch finger is pivoted, an anti-friction bearing carried by said locking pawl and engageable with said latch finger to hold it in engagement with said latch pin, and releasable means operable at will to move said locking pawl for withdrawing said bearing from engagement with said latch finger, thereby to disconnect said latch pin and finger to enable said landing gear member to swing independently of movement of said retracting member during movement of the landing gear from retracted to landing position.

15. In a retractable aircraft landing gear, a landing gear member movable during movement of the landing gear between retracted and landing positions, a retracting member carried by the aircraft, a latch pin on one of said members, a latch finger pivoted on the other of said members for engagement with said latch pin to connect said landing gear member and said retracting member for normal movement of the landing gear between retracted and landing positions by said retracting member, a locking pawl pivoted on the same member on which said latch finger is pivoted and engageable with said latch finger, a lever pivoted on said locking pawl and having a projection engageable in a recess in said latch finger, and releasing means operable at will initially to swing said lever relative to said latch finger for withdrawing its projection from the latch finger recess, and thereafter operable to swing said lever and said locking pawl conjointly as a unit to withdraw said locking pawl from engagement with said latch finger, thereby to disconnect said latch pin and finger to enable said landing gear member to swing independently of movement of said retracting member during movement of the landing gear from retracted to landing position.

16. In a retractable landing gear, a landing leg movable between retracted and landing positions, a brace strut pivoted to said leg, retracting means, means normally connecting said retracting means to said brace strut and operable to move said landing leg between retracted and landing positions, and releasable at will to disconnect said retracting means from said strut for movement of said leg from retracted position into landing position independently of said retracting means, and compression spring means interengaged between said leg and said strut, compressed by initial downward movement of said landing leg and strut toward landing position after said strut is disconnected from said retracting means, and expansible during the terminal portion of the movement of said leg and strut toward landing position to assist completion of such movement.

17. In a retractable aircraft landing gear, a landing gear leg swingable about a pivot upon the aircraft structure, a leg swinging member connected to said leg, a retracting member operable to exert a retracting force upon said leg swinging member, a latch pin carried by one of said members, a latch finger pivoted upon the other of said members to swing about a generally horizontal axis, and engageable with said latch pin when disposed generally vertically to interconnect said members for transmission by compression forces lengthwise of said latch finger of the retracting force and of the force produced by the weight of the landing gear between said retracting member and said leg swinging member, and means operable to effect swinging of said latch finger out of substantially vertical position for disengagement of said latch pin and said latch finger by the weight of the landing gear acting upon said leg swinging member.

18. In a retractable aircraft landing gear, a landing leg, dog-leg linkage interconnecting said landing leg and said aircraft for movement between aligned position of the links, when the landing gear is in landing position, and disaligned position in retracted position of the landing gear, an arm swingable relative to said dog-leg linkage, a jack permanently pivoted to the swinging end of said arm to be guided thereby, and latch means normally interconnecting said jack and said linkage to swing as a unit as the landing gear is moved by said jack between retracted and landing positions, and releasable when the landing gear is in other than landing position for disconnection of said jack and linkage to enable the landing gear to move into landing position independently of the jack and arm, and while the jack remains located by said arm.

GORDON R. STEINHOFF.
JAMES W. BLAIR.

REFERENCES CITED

The following references are of record in the file of this patent:

UNITED STATES PATENTS

| Number | Name | Date |
| --- | --- | --- |
| 1,940,836 | Ayer | Dec. 29, 1933 |
| 2,224,481 | Laraque | Dec. 10, 1940 |
| 2,278,910 | Bertran | Apr. 7, 1942 |
| 2,280,185 | Bridges | Apr. 21, 1942 |
| 2,326,020 | Dowty | Aug. 3, 1943 |

FOREIGN PATENTS

| Number | Country | Date |
| --- | --- | --- |
| 494,557 | Great Britain | Oct. 27, 1938 |
| 815,281 | France | Apr. 5, 1937 |

OTHER REFERENCES

Ser. No. 430,821, Saulnier (A. P. C.), published May 25, 1943.

Certificate of Correction

March 2, 1948.

Patent No. 2,437,135.

GORDON R. STEINHOFF ET AL.

It is hereby certified that error appears in the printed specification of the above numbered patent requiring correction as follows: Column 10, line 63, claim 3, for the word "member" read *leg*; and that the said Letters Patent should be read with this correction therein that the same may conform to the record of the case in the Patent Office.

Signed and sealed this 4th day of May, A. D. 1948.

[SEAL]

THOMAS F. MURPHY,
*Assistant Commissioner of Patents.*